United States Patent Office 3,127,418
Patented Mar. 31, 1964

3,127,418
DIOXOLATED FATTY ACID ESTERS
Frank E. Kuester, La Grange, Ill., assignor to Swift & Company, Chicago, Ill., a corporation of Illinois
No Drawing. Filed June 4, 1956, Ser. No. 589,343
3 Claims. (Cl. 260—340.9)

This invention in general relates to new compositions of matter and to methods for producing said compositions. More specifically, the compositions of the present invention comprise fatty acid esters, at least one acyl radical of which is characterized by at least one dioxolane group in said acyl radical and to processes for preparation thereof.

The reaction of dihydroxy stearic acid with ketones and aldehydes such as acetone and benzaldehyde have been reported as yielding dioxolanes. These reactions are carried out by refluxing the reactants for 8–12 hours under substantially anhydrous conditions in the presence of catalytic amounts of anhydrous hydrogen chloride. However, the reaction is not applicable to esters of dihydroxy fatty acids since the esters tend to polymerize as estolides through alcohol interchange at the carboxyl group.

The method of this invention on the other hand is characterized by the formation of at least one dioxolane grouping on at least one fatty acyl radical of the ester. The ester groups are not affected under the conditions herein outlined, and the formation of estolides is kept at a minimum.

Dioxolation of fatty compositions according to the principles of the present invention is accomplished by reacting a ketone or aldehyde with an epoxy group in the fatty composition. The reaction is catalyzed by a strong Lewis acid such as the fluorides and chlorides of boron, aluminum and tetravalent tin. The reaction is exothermic and is complete in a short time. After neutralization of the catalyst and removal of the excess carbonyl composition, the aliphatic composition, at least one radical of which contains a dioxolane group, is obtained as the final product. The same principles are applicable to dioxolation of epoxy fatty acid esters of monohydric and other polyhydric alcohols.

In the preparing of the compounds of this invention, it is preferred to react the carbonyl composition and ester of epoxy fatty acids in a molar ratio of at least 5:1 where no solvent is employed. Where a solvent such as benzene, toluene, etc., is used, a 1:1 molar ratio preferably a slight excess over the stoichiometric amount of the carbonyl composition per mol of oxirane oxygen is sufficient. The preferred catalyst is boron trifluoride which may be utilized as a dissolved gas or by addition to the reactants of a boron trifluoride-ether complex. The excess of carbonyl compound is employed to minimize polymerization through the oxirane group and to improve the equilibrium of the reaction in favor of the formation of the dioxolane.

The compositions of this invention are fatty acid esters characterized by the grouping

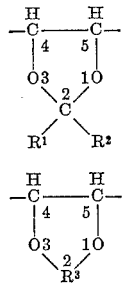

in at least one aliphatic acyl radical wherein $R^1$ may be hydrogen, aliphatic, aryl, acyl substituted alkyl groups; $R^2$ may be hydrogen, aliphatic, aryl, acyl substituted alkyl groups; and $R^3$ is an alicyclic group, with the carbons of the acyl radical in the 4,5 position of the dioxolane group.

The carbonyl compositions which may be reacted according to the principles of this invention include alkyl aldehydes and ketones such as acetaldehyde, acetone, oleone, stearone, etc.; and aryl, alkyl acyl, and alicyclic aldehydes and ketones such as benzaldehyde, acetophenone, cyclohexanone, and camphor. The acid portion of the ester is an aliphatic, monocarboxylic acyl group of 10–22 carbons. The alcohol portion comprises monohydric and polyhydric alcohol radicals such as methyl through octadecyl or glyceryl.

In some instances, the carbonyl composition is liquid at room and reaction temperatures and will serve as a solvent for the epoxy esters. However, with compositions such as oleone and stearone, it is necessary to utilize a mutual solvent to hold the products in solution for reaction. Suitable solvents for this purpose are non-reactive type solvents such as aromatic hydrocarbons (benzene, toluene, etc.).

The following examples illustrate the applicability of the instant invention to the specific compositions. They are provided for the purpose of illustration and better understanding of the invention and hence should not be construed as placing any limitations on the invention defined in the appended claims.

Example I

Sixty grams of epoxidized soybean oil was mixed with two hundred grams of acetone. One milliliter of boron trifluoride-etherate complex was dissolved in 10 ml. of acetone and this was added to the stirred mixture of acetone and epoxidized soybean oil. After a short period a rise of temperature was noted, and when the reaction temperature reached 57° C. part of the acetone distilled off.

When the exothermic reaction had subsided and the mixture had cooled to 30° C., the entire reaction mixture was poured into a liter of water and the oil layer separated. This layer was washed several times with water and then dried over anhydrous sodium sulfate.

The product was isolated as a viscous yellow oil and having a saponification value of 151. The theoretical saponification number is 159.

Example II

Twenty-six grams of camphor was dissolved in 150 ml. of diethyl ether, and to this mixture was added 31 grams of epoxidized soybean oil. One-half milliliter of boron trifluoride-etherate was dissolved in 5 ml. of ether and was added to the reaction mixture. The reaction was started by warming the mixture to the boiling point of ether and was allowed to stand at room temperature until the exothermic reaction had subsided.

After removal of the ether by distillation the reaction mixture was subjected to vacuum sublimation to remove the unreacted camphor.

The product was a highly viscous oil which gave no indication of containing any oxirane groups.

Example III

Thirty grams of epoxidized soybean oil and 10 grams of benzaldehyde were dissolved in 35 grams of benzene. This mixture was reacted by adding to it 0.2 ml. of boron trifluoride-etherate in 5 ml. of ether. After the exothermic reaction had subsided, the mixture was washed with a 50% solution of sodium bisulfate to remove the unreacted benzaldehyde.

After removal of the benzene, the resulting product, which was a viscous oil, had a saponification number of 137 and showed no evidence of containing any oxirane groups.

*Example IV*

Thirty grams of epoxidized soybean oil and 12 grams of acetophenone were dissolved in 50 grams of benzene. The reaction was catalyzed by adding 0.5 ml. of boron trifluoride-etherate in 5 ml. of ether. The temperature of the reaction mixture rose from 25 to 47° C.

The benzene and unreacted acetophenone were removed by steam distillation. The saponification value of the product was 162.

*Example V*

One hundred grams of oleone and 30 grams of epoxidized soybean oil were dissolved in 200 ml. of benzene and were warmed to 50° C. to keep the reaction mixture fluid. To this was added 2 ml. of boron trifluoride-etherate dispersed in 5 ml. of benzene. An exothermic reaction was noted, and the benzene was removed by distillation. The unpurified product was a solid melting at about 42° C.

*Example VI*

To 35 grams of methyl epoxystearate was added 10 grams of cyclohexanone containing 1% boron trifluoride-etherate. During the addition the mixture was stirred constantly, and the temperature rose to 80° C.

After the exothermic reaction had subsided the product was washed with water and dried over anhydrous sodium sulfate. The saponification number of the product was 134.

*Example VII*

To a mixture of 30 grams of methyl epoxystearate and 100 grams of acetone was added 1 ml. of boron trifluoride-etherate in 5 ml. of acetone. The reaction was exothermic and the temperature rose to the boiling point of the acetone. The product was isolated by washing the excess acetone from the product and drying over anhydrous sodium sulfate. The product was a light colored oil having a saponification number of 155.

*Example VIII*

100 grams phenyl acetaldehyde and 100 grams of epoxidized soybean oil were dissolved in 200 ml. of diethyl ether at room temperature. The mixture was agitated and 2 grams of borontrifluoride-etherate in 50 ml. of ether were added. After a short time the temperature of the mixture spontaneously rose to the boiling point of the ether, and when the exothermic reaction had subsided, the mixture was refluxed on the steam bath for one-half hour. At the completion of the refluxing period, the solvent was removed by evaporation, and excess phenyl acetaldehyde was removed by steam distillation. The residue from the steam distillation was a light colored viscous oil having a saponification number of 159.

*Example IX*

To a mixture of 30 grams of epoxidized sperm oil and 100 grams of acetone was added 2 ml. of boron trifluoride-etherate in 10 ml. of acetone. After the exothermic reaction had subsided the acetone was washed from the product with water. The dried product was a viscous oil having a saponification number of 128.

These compositions of the present invention are in general viscous oils. The esters, particularly those of polyhydric alcohols, such as glycerol, are useful as plasticizers for vinyl floor tile and ethyl cellulose.

The epoxy fatty triglycerides may be compounded by the epoxidation of animal, vegetable, or marine oils wherein the triglycerides contain unsaturated fatty acyl radicals. Epoxidation may be by any known method such as by oxidation with peracetic acid. The manner of epoxidation is not a critical element of the instant invention. Epoxidized oils which are suggested as good compositions for the synthesis of the dioxolane triglycerides of this invention are epoxidized soybean oil, rapeseed oil, menhaden oil, olive oil, palm oil, peanut oil, sesame oil, lard oil, linseed oil, and cottonseed oil, to name a few. Epoxidized sperm oil and methyl epoxy stearate are examples of monohydric alcohol esters of epoxy fatty acids which can be reacted according to the principles of the instant invention.

When the more unsaturated oils, such as soybean oil, olive oil, and linseed oil, are epoxidized and then reacted according to the principles of this invention, the triglycerides will have several dioxolane groups per molecule. If lesser amounts of dioxolane groups are desired per molecule, the more saturated oils may be epoxidized or the more unsaturated oils may be only partially epoxidized. The degree of epoxidation may be varied considerably and is determined largely by the amount of dioxolation desired.

When the above oils are used in making the dioxolanes of the instant invention, the final glyceride product will, of course, contain some saturated fatty acid radicals such as stearic and palmitic acids. If a product is desired wherein each glyceride acyl radical contains at least one dioxolane group, compositions such as triolein, trilinolein or monolinoleic diolein may be prepared by known procedures, epoxidized and reacted with a carbonyl composition in the above-described manner.

Obviously many modifications and variations of the invention as hereinbefore set forth may be made without departing from the spirit and scope thereof, and therefore only such limitations should be imposed as are indicated in the appended claims.

I claim:

1. The glyceride esters of fatty acids having 10–22 carbons, at least one fatty acyl radical of said esters having at least one dioxolane group on contiguous carbons of said radical, said carbons being in the 4,5 position of said dioxolane group.

2. The glyceride esters of fatty acids having 10–22 carbons, at least one fatty acyl radical of said esters having at least one dioxolane group on contiguous carbons of said radical, said carbons being in the 4,5 position of said dioxolane group, and alkyl groups on the carbon in the 2 position of said group.

3. The product of claim 1 wherein the glyceride esters are glycerides of soybean oil.

References Cited in the file of this patent

UNITED STATES PATENTS 2,569,502    Swern et al. _____ Oct. 2, 1951

OTHER REFERENCES

Bogert et al.: J.A.C.S. 55, pp. 3741–5 (1933).
Petrov: J. Gen. Chem. (U.S.S.R.), 10, 981–6 (1940) (Chem. Abst.., vol. 35, p. 3603 (1941).
Petrov: J. Gen. Chem. (U.S.S.R.), 16, 61–4 (1946) (Chem. Abst., vol. 41, p. 118 (1947).
Chemical and Eng. News, September 12, 1955 issue, p. 3759.
Becco: Bulletin No. 69, pp. 10 and 43, November 20, 1955.